United States Patent [19]

Ando et al.

[11] 4,279,323

[45] Jul. 21, 1981

[54] POWER STEERING DEVICE FOR WHEELED VEHICLES

[75] Inventors: Masahisa Ando, Aichi; Keigo Kato; Tomozi Ishikawa, both of Toyota, all of Japan

[73] Assignee: Toyota Jidosha Kogyo Kabushiki Kaisha, Toyota, Japan

[21] Appl. No.: 68,533

[22] Filed: Aug. 21, 1979

[30] Foreign Application Priority Data

Sep. 1, 1978 [JP] Japan .................................. 53-107806

[51] Int. Cl.³ .............................................. B62D 5/06
[52] U.S. Cl. .................................. 180/148; 74/388 PS
[58] Field of Search ............... 180/132, 144, 145, 146, 180/147, 148, 149–163; 74/388 PS, 422; 91/368, 382, 378, 375 R, 375 A; 137/625.69

[56] References Cited

U.S. PATENT DOCUMENTS

| | | | |
|---|---|---|---|
| 2,826,258 | 3/1958 | Livers | 74/388 PS X |
| 3,292,499 | 12/1966 | Duffy | 91/368 |
| 3,481,147 | 12/1969 | Goff | 91/375 X |
| 3,645,296 | 2/1972 | Adams | 91/375 A |
| 3,973,640 | 8/1976 | Nismikawa | 180/132 |

FOREIGN PATENT DOCUMENTS

| | | | |
|---|---|---|---|
| 535506 | 2/1955 | Belgium | 180/148 |
| 1129847 | 5/1962 | Fed. Rep. of Germany | 180/148 |

Primary Examiner—Randolph A. Reese
Assistant Examiner—Randall A. Schrecengost
Attorney, Agent, or Firm—Armstrong, Nikaido, Marmelstein & Kubovcik

[57] ABSTRACT

A power steering device includes a steering shaft assembly, a driven member for operative connection with the steering road wheels for a vehicle and operatively connected with the steering shaft assembly, an hydraulic cylinder of actuating the driven member by fluid under pressure supplied thereto, an hydraulic circuit connecting the cylinder to a source of fluid pressure, and a switching valve having a valve member to be moved in response to rotation of the shaft assembly in an axial direction, the valve disposed within the hydraulic circuit to control the supply of fluid under pressure in response to axial movement of the valve being member. A cam mechanism is associated with the steering shaft assembly to conduct the axial movement of the valve member in response to rotation of the steering shaft assembly.

5 Claims, 7 Drawing Figures

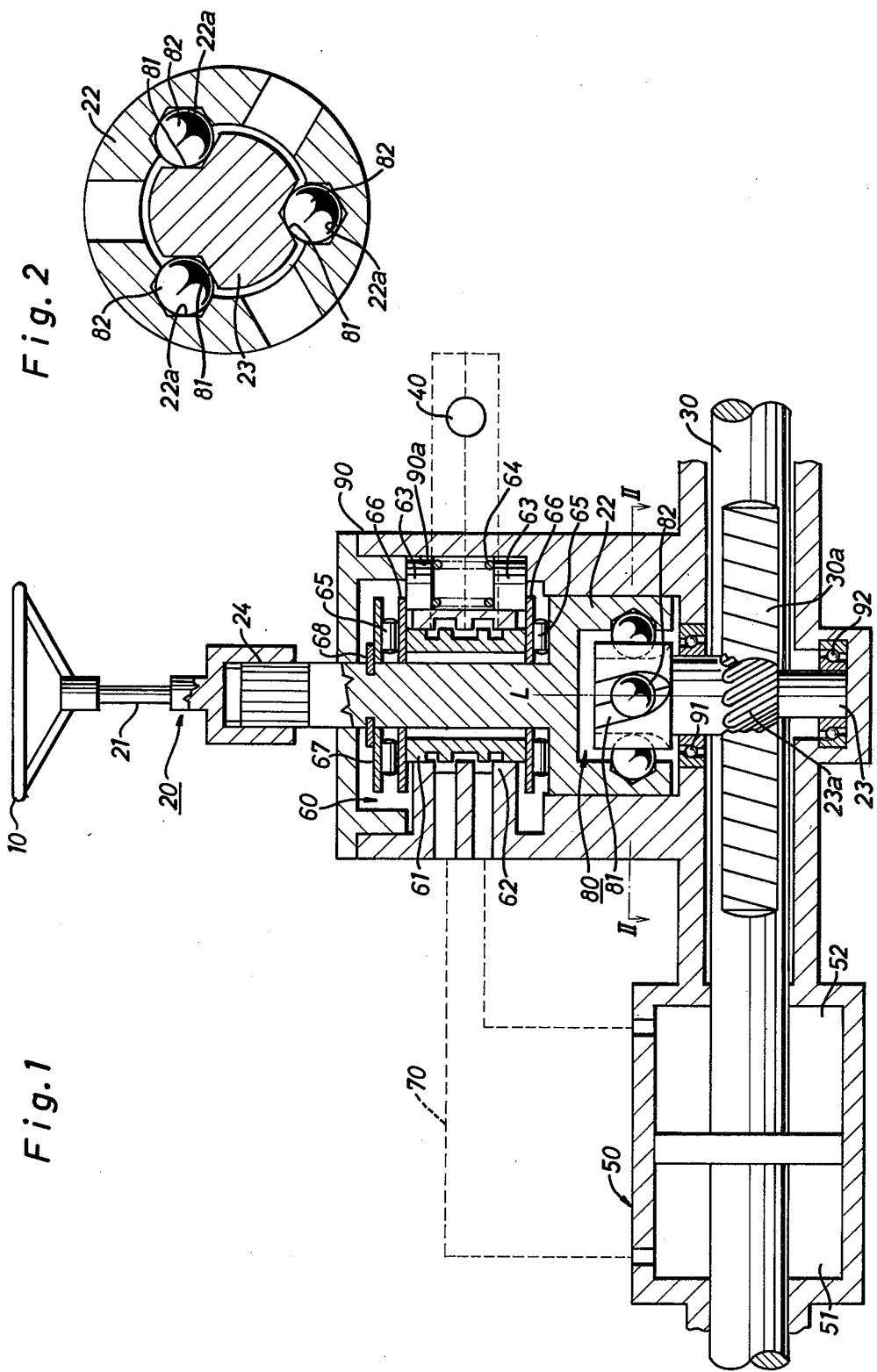

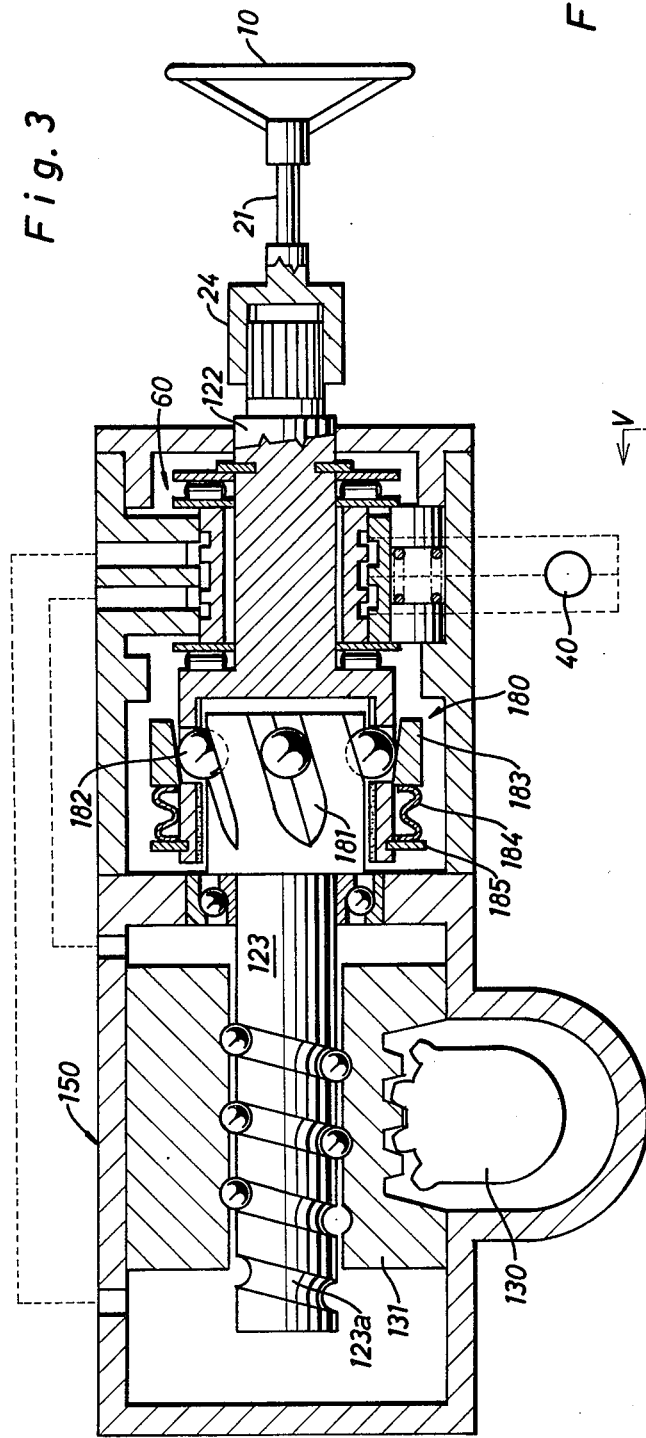
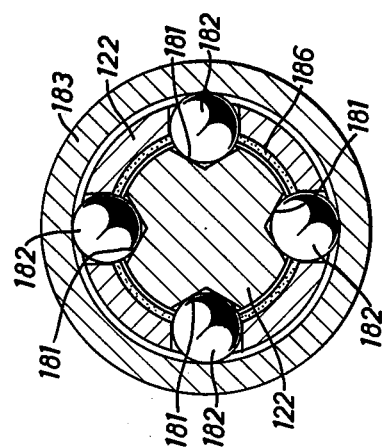

POWER STEERING DEVICE FOR WHEELED VEHICLES

BACKGROUND OF THE INVENTION

The present invention relates to power steering devices for wheeled vehicles, and more particularly to a power steering device of the type which includes a steering shaft assembly, a driven member for operative connection with the steering road wheels of the vehicle and moved by rotational torque of the shaft assembly, an hydraulic cylinder for actuating the driven member by fluid under pressure supplied thereto from a source of fluid pressure, an hydraulic circuit connecting the cylinder to the fluid pressure the source, and valve means having a valve member to be moved in response to rotation of the shaft assembly in an axial direction, the valve means being disposed within the hydraulic circuit to control the supply of fluid under pressure in response to axial movement of the valve member.

SUMMARY OF THE INVENTION

The primary object of the present invention is to provide an improved power steering device in which a cam mechanism is associated in a simple construction with the steering shaft assembly to quickly conduct the axial movement of the valve member in response to rotation of the steering shaft assembly.

In a preferred embodiment of the present invention, the above-noted steering shaft assembly includes an upper shaft connected with the steering wheel, a lower shaft operatively connected with the driven member and an intermediate shaft interposed between the upper and lower shafts and being operatively engaged with the valve member, and the cam mechanism is arranged between the intermediate shaft and one of the upper and lower shafts for transmitting rotational torque of the upper shaft to the lower shaft and for conducting axial movement of the intermediate shaft in response to rotation of the upper shaft.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a sectional view of a power steering device of rack and pinion type in accordance with the present invention;

FIG. 2 shows a cross-section taken along the plane of line II—II in FIG. 1;

FIG. 3 is a sectional view of a power steering device of ball-screw type in accordance with the present invention;

FIG. 4 is an enlarged sectional view of a portion of FIG. 3;

FIG. 5 shows a cross-section taken along the plane of line V—V in FIG. 4;

DESCRIPTION OF THE PREFERRED EMBODIMENTS

Figure 6:
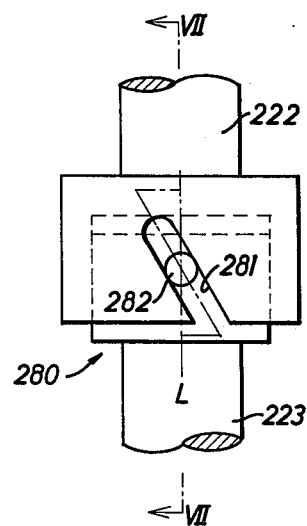
FIG. 6 shows a modification of the present invention.

Referring now in particular to FIG. 1 of the drawings, a power steering device of rack and pinion type comprises a steering shaft assembly 20 rotated by a steering wheel 10 and a lateral shaft 30 operatively connected in a conventional manner to the steering road wheels of a vehicle by means of any suitable mechanical linkage. The lateral shaft 30 has a rack portion 30a in mesh with a pinion 23a of steering shaft assembly 20 and is moved transversely by meshing engagement of rack 30a and pinion 23a in response to rotation of the steering wheel 10. The transverse movement of shaft 30 is assisted by operation of an hydromechanical servomechanism. The servomechanism includes a source of hydraulic pressure in the form of a fluid pump 40, an hydraulic cylinder 50 for actuating the lateral shaft 30 by hydraulic pressure applied thereto from fluid pump 40, an hydraulic circuit 70 connecting hydraulic cylinder 50 to fluid pump 40, and a switching valve assembly 60 disposed within hydraulic circuit 70 to control the hydraulic pressure applied to cylinder 50.

The steering shaft assembly 20 includes an upper shaft 21 integral with steering wheel 10, a lower shaft 23 provided thereon with the pinion 23a and an intermediate shaft 22 coaxially interposed between shafts 21 and 23 and carrying thereon a spool valve member 61 of switching valve assembly 60. Provided between shafts 21 and 22 is a spline connection 24 for transmitting rotation torque from steering wheel 10 to shaft 22 and for permitting relative axial movements between shafts 21 and 22. Upper shaft 21 is rotatably supported in place by means of a conventional column tube assembly (not shown), while lower shaft 23 is housed within a housing 90 and rotatably supported in place by a pair of ball bearings 91 and 92.

A cam mechanism 80 is provided to transmit rotational torque from shaft 22 to shaft 23 and to move the shaft 22 in response to rotation of shaft 23 in an axial direction. As is clearly seen in FIGS. 1 and 2, the cam mechanism 80 includes three cam grooves 81 formed on shaft 23 and three steel balls 82 arranged between shafts 22 and 23. The cam grooves 81 are respectively formed in a V-shaped cross-section and equidistantly spaced around the upper end of shaft 23. As shown in FIG. 1, each of grooves 81 slants at a predetermined angle relative to the axis line L of steering shaft assembly 20. The intermediate shaft 22 is provided at its lower cylindrical portion with three recesses 22a which correspond with the cam grooves 81. The balls 82 are assembled within recesses 22a respectively and rotatable along cam grooves 81. Each of balls 82 is supported at its two points on each of cam grooves 81. Each of recesses 22a is drilled by a tool inserted radially inwardly from the outer periphery of shaft 22 to facilitate the drilling works.

The switching valve assembly 60 is of an open-center type which acts to selectively supply fluid under pressure from pump 40 to left and right chambers 51, 52 of cylinder 50 in response to axial movements of shaft 22. The switching valve assembly 60 includes a valve casing 62 in which the spool valve member 61 is axially slidable, a plurality of pairs of push-rods 63 and a plurality of compression springs 64 respectively interposed between each pair of push-rods 63. The spool valve member 61 is formed in a cylindrical shape and surrounds the neck portion of shaft 22. The spool valve member 61 is supported by a pair of needle bearings 65 through a pair of annular plates 66 and is assembled in position by a fastener clip 68 through an annular retainer plate 67. The fastener clip 68 is fixed to shaft 22 to restrict axial movements of the spool valve member 61 on a shoulder of shaft 22 and to permit relative rotation between shaft 22 and spool valve member 61. The housing 90 is provided at its peripheral wall with a plurality of axial bores 90a which are equidistantly spaced and in each of which a pair of push rods 63 are slidably assembled. Each pair of push rods 63 are further biased by the spring 64 in opposite directions and engaged with annular plates 66 in a neutral position. In this assembly, the pair of needle bearings 65 act to reduce rotational resistance caused by engagement of plates 66 against push rods 63.

In operation, rotational torque of the steering wheel 10 is transmitted to lower shaft 23 through shafts 21, 22 and cam mechanism 80 and from lower shaft 23 to lateral shaft 30 by engagement of pinion 23a and rack 30a. Then, the lateral shaft 30 is moved leftward or rightward in response to rotation of the steering wheel 10, and the movement of shaft 30 is assisted by operation of the servomechanism. When the rotational torque is transmitted from shaft 22 to shaft 23, component of a force in an axial direction is given to shaft 22 by engagement of balls 82 and cam grooves 81. This results in axial movement of shaft 22 and spool valve member 61 against the biasing force of springs 64. Thus, the switching valve 60 is switched over in response to the axial movement of spool valve member 61 to supply fluid under pressure from pump 40 to the left chamber 51 or the right chamber 52 of hydraulic cylinder 50, and the movement of lateral shaft 30 is assisted by operation of the hydraulic cylinder 50.

In operation of the cam mechanism 80, the point contacts of balls 82 and cam grooves 81 serve to reduce undesired frictions caused by the component of a force or the return force of compressed springs 64 and to ensure smooth rolling of balls 82 along cam grooves 81. As a result, the axial movement of shaft 22 and spool valve member 61 is quickly conducted in response to the component of a force or its release so that the steering force given to the lateral shaft 30 is reliably boosted in response to rotation of the steering wheel 10.

FIGS. 3 to 5 illustrate a power steering device of ball-screw type in which a lower shaft 123 is provided with a spiral groove 123a. An hydraulic cylinder 150 is provided therein with a piston 131 which is reciprocably mounted on the spiral grooved portion of lower shaft 123 through a plurality of balls. A sector shaft 130 is connected in a conventional manner to the steering road wheels of a vehicle by means of any suitable mechanical linkage and has a sector arc of gear teeth formed thereon and in mesh with rack teeth of the piston 131. A cam mechanism 180 corresponds with the cam mechanism 80 described above and comprises four cam grooves 181 equidistantly formed on the upper end of lower shaft 123, four steel balls 182 rotatable along cam grooves 181, and a sleeve member 183 receiving balls 182 therein. The sleeve member 183 is axially slidable on the lower cylindrical portion of an intermediate shaft 122, and an annular spring member 184 is supported by a fastener clip 185 at its lower end to bias the sleeve member 183 upwardly, the fastener clip 185 being fixed to the lower end of shaft 122. The sleeve member 183 is formed at its inner wall with a taper surface 183a which acts to urge the balls 182 radially and inwardly. A cylindrical retainer 186 is coupled within the cylindrical portion of shaft 122 and has four holes in each of which the balls 182 are assembled in position without any play. All other constructions and functions remain unchanged, and the same reference numerals indicate the same component parts and portions.

Figure 7:
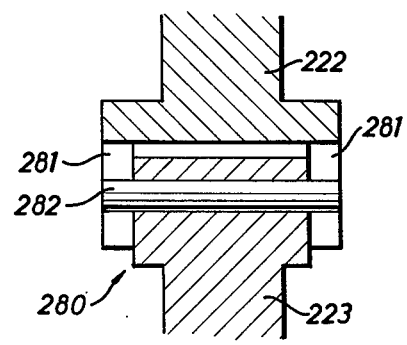
FIG. 7 is a sectional view taken along the plane of line VII—VII in FIG. 6.

In practices of the present invention, the cam mechanism 80 or 180 may be replaced with another cam mechanism 280 as shown in FIGS. 6 and 7. The cam mechanism 280 comprises a pair of cam grooves 281 formed on an intermediate shaft 222 and a cam pin 282 fixed to a lower shaft 223. The pair of cam grooves 281 slant at a predetermined angle in relation to the axis line L of the shaft assembly, and the cam pin 282 is slidably received by the pair of cam grooves 281 at its opposite ends. The intermediate shaft 222 corresponds with the shaft 22 or 122, and the lower shaft 223 corresponds with the shaft 23 or 123. Thus, the cam mechanism 280 acts to transmit rotational torque from shaft 222 to shaft 223 and to move the shaft 222 in response to rotation of 223. In practice of another modification of the present invention, the cam mechanism 80, 180 or 280 may be interposed between the upper shaft and the intermediate shaft. In this case, the lower shaft is connected to the intermediate shaft by means of a spline connection. In addition, it is to be noted that the present invention may as well be applied to various other type power steering devices.

Having now fully set forth both structure and operation of preferred embodiments of the concept underlying the present invention, various other embodiments as well as certain variations and modifications of the embodiments herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. In a power steering device for wheeled vehicles comprising a steering shaft assembly including first and second shafts arranged for relative rotation on aligned axes, a driven member for operative connection with the steering road wheels of the vehicle and arranged to be driven by rotational torque of said steering shaft assembly, a hydraulic cylinder for actuating said driven member by fluid under pressure supplied thereto from a source of fluid pressure, a hydraulic circuit connecting said cylinder to said fluid pressure source to supply fluid under pressure to said cylinder, valve means having a valve member arranged to be moved in response to rotation of said steering shaft assembly in an axial direction, said valve means being disposed within said hydraulic circuit to control the supply of fluid under pressure in response to axial movement of said valve member, and a cam mechanism associated with said steering shaft assembly for transmitting rotational torque of said first shaft to said driven member through said second shaft and for conducting axial movement of said valve member in response to rotation of said shaft assembly, the improvement wherein one of said shafts is provided at its inner end with a cylindrical portion and the other shaft has an inner end coupled within the cylindrical portion of the one shaft, and wherein said cam mechanism comprises at least one cam groove formed on the inner end of the other shaft at a predetermined angle relative to the axis line of said steering shaft assembly, at least one ball radially movable in the cylindrical portion of the one shaft and operatively engaging said cam groove, and a sleeve member in surrounding relationship to the cylindrical portion of the one shaft and being biased to urge said at least one ball towards said at least one cam groove.

2. The improvement as claimed in claim 1, wherein said cam mechanism comprises a plurality of cam grooves equidistantly formed on the inner end of the other shaft at a predetermined angle relative to the axis line of said steering shaft assembly, a plurality of balls radially movable in the cylindrical portion of the one shaft and operatively engaging each of said cam grooves, and a sleeve member in surrounding relationship to the cylindrical portion of the one shaft and being biased to urge said balls toward said cam grooves.

3. The improvement as claimed in claims 1 or 2, wherein said sleeve member is formed at its inner wall with a taper surface which acts to urge said balls radially and inwardly.

4. The improvement as claimed in claims 1 or 2, wherein a cylindrical retainer is coupled within the cylindrical portion of the one shaft for supporting said balls in place therein.

5. In a power steering device for wheeled vehicles comprising a steering shaft assembly including first and second shafts arranged for relative rotation on aligned axes, a driven member for operative connection with the steering road wheels of the vehicle and arranged to be driven by rotational torque of said steering shaft assembly, a hydraulic cylinder for actuating said driven member by fluid under pressure supplied thereto from a source of fluid pressure, a hydraulic circuit connecting said cylinder to said fluid pressure source to supply fluid under pressure to said cylinder, valve means having a spool valve arranged to be moved in response to rotation of said steering shaft assembly in an axial direction, said spool valve being disposed within said hydraulic circuit to control the supply of fluid under pressure in response to axial movement of said spool valve, and a cam mechanism associated with said steering shaft assembly for transmitting rotational torque of said first shaft to said driven member through said second shaft and for conducting axial movement of said spool valve in response to rotation of said shaft assembly, the improvement wherein said first shaft is integrally formed at its inner end with a cylindrical portion and said second shaft has an inner end coupled within the cylindrical portion of said first shaft, and wherein said cam mechanism comprises a plurality of cam grooves equidistantly formed in a V-shaped cross-section on the inner end of said second shaft and located at a predetermined angle relative to the axis line of said steering shaft assembly, a plurality of balls radially movable in the cylindrical portion of said first shaft and operatively engaging each of said cam grooves, a sleeve member in surrounding relationship to the cylindrical portion of said first shaft and being formed at its inner wall with a taper surface, and resilient means for biasing said sleeve member in the axial direction to urge said balls toward said cam grooves.

* * * * *